United States Patent
Park

(10) Patent No.: US 6,273,838 B1
(45) Date of Patent: Aug. 14, 2001

(54) GEAR TRAIN FOR VEHICLE AUTOMATIC TRANSMISSIONS

(75) Inventor: Jong-Sool Park, Suwon (KR)

(73) Assignee: Hyundai Motor Company (KR)

( * ) Notice: Subject to any disclaimer, the term of this patent is extended or adjusted under 35 U.S.C. 154(b) by 0 days.

(21) Appl. No.: 09/465,931

(22) Filed: Dec. 17, 1999

(30) Foreign Application Priority Data

Jul. 8, 1999 (KR) .................................................. 99-27510

(51) Int. Cl.$^7$ ...................................................... F16H 3/62
(52) U.S. Cl. ............................................. 475/280; 475/313
(58) Field of Search .................................. 475/271, 280, 475/296, 313, 319, 325

(56) References Cited

U.S. PATENT DOCUMENTS 3,010,343 * 11/1961 Orr et al. ............................ 475/280
4,483,215 * 11/1984 Ishimaru et al. ................. 475/280 X

FOREIGN PATENT DOCUMENTS

0305045 * 1/1989 (EP) .
59-126139 * 7/1984 (JP) .
02-107863 * 4/1990 (JP) .

* cited by examiner

*Primary Examiner*—Richard M. Lorence
*Assistant Examiner*—Ankur Parekh
(74) *Attorney, Agent, or Firm*—Finnegan, Henderson, Farabow, Garrett & Dunner, L.L.P.

(57) ABSTRACT

A gear train for an automatic transmission includes a first planetary gear set having a first element variably connected to an input shaft and a transmission housing, a second element variably connected to the input shaft and the transmission housing, and a third element connected to a transfer shaft to transmit power to the transfer shaft, a second planetary gear set having a fourth element connected to the transfer shaft to transmit power to the transfer shaft, a fifth element variably connected to the input shaft, and a sixth element fixedly connected to the second element to provide a combination element, the combination element being variably connected to the input shaft, and a plurality of friction elements for variably connecting the first, second, fifth, and sixth element to either the input shaft or the transmission housing.

14 Claims, 3 Drawing Sheets

| Shift Range \ Friction Element | C1 | C2 | C3 | B1 | B2 |
|---|---|---|---|---|---|
| D1 | O |  |  | O |  |
| D2 |  | O |  | O |  |
| D3 | O | O |  |  |  |
| D4 |  | O | O |  |  |
| D5 | O |  | O |  |  |
| R1 | O |  |  |  | O |

GEAR TRAIN FOR VEHICLE AUTOMATIC TRANSMISSIONS

BACKGROUND OF THE INVENTION (a) Field of the Invention

The present invention relates to a gear train for an automatic transmission used in vehicles. More particularly, the invention relates to a gear train for a 5-forward speed and 1-reverse speed automatic transmission.

(b) Description of the Related Art

Generally, automatic transmission systems for vehicles are provided with a transmission control unit (TCU) which automatically controls shift ratios according to changes in a running condition of the vehicle.

The typical TCU controls a plurality of friction elements provided in a gear train to either operative or inoperative states to select one of the three essential elements of a planetary gear set (i.e., a sun gear, a ring gear, or a planetary carrier) to be an input element, a reaction element, or an output element, thereby controlling an output number of revolutions.

Particularly, a gear train that can realize 5-forward speeds and 1-reverse speed comprises a plurality of heavy and large-sized clutches and brakes and a plurality of inoperative friction elements, resulting in deterioration of power and space efficiencies.

SUMMARY OF THE INVENTION

Therefore, the present invention has been made in an effort to solve the above problems.

It is an object of the present invention to provide a gear train for an automatic transmission that is lightweight and compact in size, while at the same time providing improved power efficiency.

To achieve the above object, the present invention provides a gear train for an automatic transmission, the gear train comprising a first planetary gear set having a first element variably connected to an input shaft and a transmission housing, a second element variably connected to the input shaft and the transmission housing, and a third element connected to a transfer shaft to transmit power to the transfer shaft, a second planetary gear set having a fourth element connected to the transfer shaft to transmit power to the transfer shaft, a fifth element variably connected to the input shaft, and a sixth element fixedly connected to the second element to provide a combination element, the combination element being variably connected to the input shaft, and friction means for variably connecting the first, second, fifth, and sixth elements to either the input shaft or the transmission housing.

Preferably, the first and second planetary gear sets are double pinion planetary gear sets.

Preferably, the first element is a first sun gear, the second element is a first planet carrier, the third element is a first ring gear, the fourth element is a second planet carrier, the fifth element is a second sun gear, and the sixth element is a second ring gear.

Preferably, the friction means comprise a first clutch disposed between the input shaft and the second sun gear, a second clutch disposed between the input shaft and the combination of the first planet carrier and the second ring gear, a third clutch disposed between the input shaft and the first sun gear, a first brake disposed between the transmission housing and the first sun gear, and a second brake disposed between the first planet carrier and the transmission housing.

In the above described inventive gear train, a first speed is realized by operating the first clutch and the first brake, a second speed is realized by operating the second clutch and the first brake, a third speed is realized by operating the first and second clutches, a fourth speed is realized by operating the second and third clutches, a fifth speed is realized by operating the first and third clutches, and a reverse speed is realized by operating the first clutch and the second brake.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figures 1, 2:
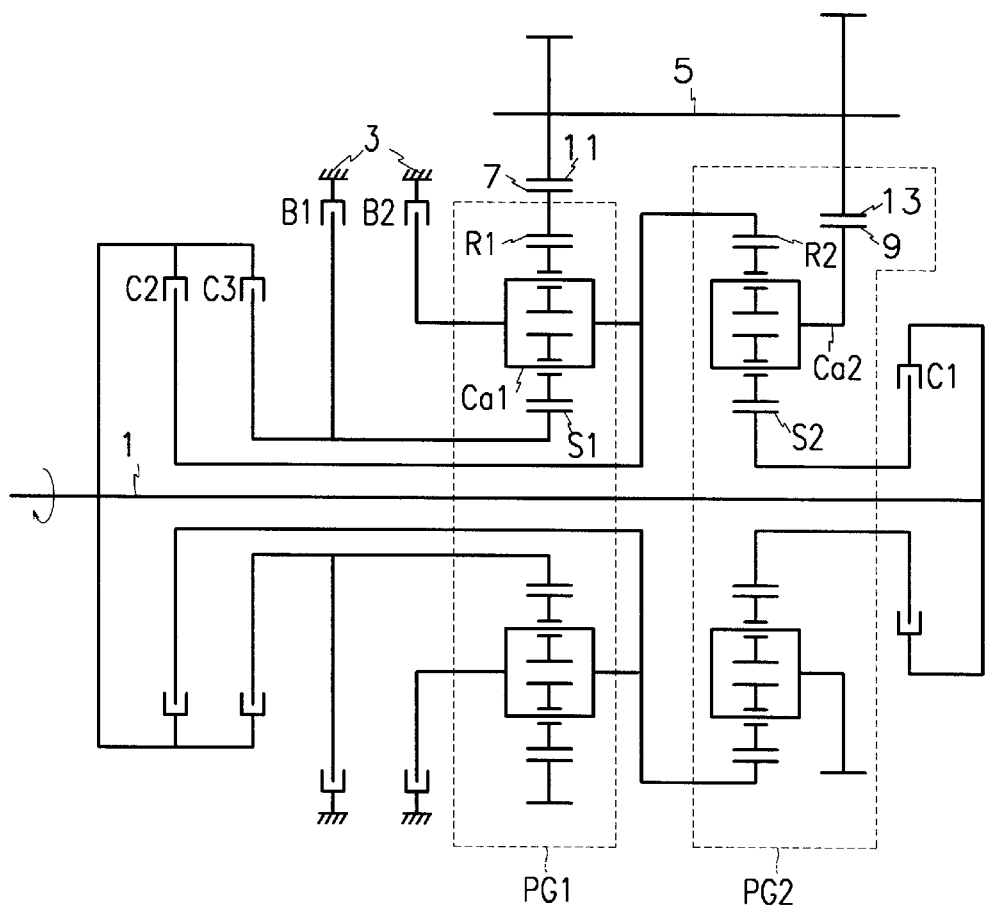
FIG. 1 is a schematic diagram of a gear train for an automatic transmission according to a preferred embodiment of the present invention.
FIG. 2 is an operational chart of friction elements in each shift range according to a preferred embodiment of the present invention.

FIG. 1 shows a schematic diagram of a gear train according to a preferred embodiment of the present invention.

The inventive gear train comprises first and second planetary gear sets PG1 and PG2 that are disposed around an input shaft 1. The first planetary gear set PG1 is a double pinion type, which comprises a sun gear S1 variably connected to a transmission housing 3 and the input shaft 1, a carrier Ca1 variably connected to the sun gear S1, the input shaft 1, and the transmission housing 3, and a ring gear R1 connected to the transfer shaft 5 to transmit power thereto.

The second planetary gear set PG2 is also a double pinion type, which comprises a sun gear S2 variably connected to the input shaft 1, a carrier Ca2 connected to the transfer shaft 5 to transmit power thereto, and a ring gear fixedly connected to the carrier Ca1 of the first planetary gear set PG1 while being variably connected to the input shaft 1.

For the above described variable connections, a first clutch C1 is interposed between the input shaft 1 and the sun gear S2 of the second planetary gear set PG2, a second clutch C2 is interposed between the input shaft 1 and the combination of the fixed carrier Ca1 of the first planetary gear set PG1 and the ring gear R2 of the second planetary gear set, and a third clutch C3 is interposed between the input shaft 1 and the sun gear S1 of the first planetary gear set PG1.

In addition, a first brake B1 is interposed between the sun gear S1 of the first planetary gear set PG1 and the transmission housing 3, a second brake B2 is interposed between the transmission housing 3 and the combination of the fixed carrier Ca1 and the ring gear R2.

As a result of the above, through the selective operation of the first, second, and third clutches C1, C2, and C3 and the first and second brakes B1 and B2, five (5) forward speeds and one (1) reverse speed are realized and transmitted to the transfer shaft 5. The selective operation of the friction elements is controlled by the TCU. First and second transfer drive gears 7 and 9 respectively fixed on the first and second planetary gear sets PG1 and PG2 are respectively engaged with first and second transfer driven gears 11 and 13 of the transfer shaft 5.

That is, the friction elements are operated in each speed as shown in the friction elements operation chart of FIG. 2. The shift process will be explained hereinafter using the operation chart of FIG. 2 and the lever analogy diagrams of FIGS. 3, 4, 5, 6, and 7, in which the first and second planetary gear sets PG1 and PG2 are represented by first to fifth levers L1 to L5.

The first to fifth nodes N1 to N5 located on each lever denotes each element of the first and second planetary gear sets PG1 and PG2. That is, the first node N1 denotes the sun gear S2 of the second planetary gear set PG2, the second node N2 denotes the carrier Ca1 and the ring gear R2 which are fixed to each other, the third node N3 denotes the carrier Ca2 of the second planetary gear set PG2, the fourth node N4 denotes the ring gear R1 of the first planetary gear set PG1, and the fifth node N5 denotes the sun gear S1 of the first planetary gear set PG1.

First-Forward Speed

A speed ratio of the first-forward speed will be explained hereinafter with reference to FIG. 3.

When the first clutch C1 and the first brake B1 are operated by the TCU as shown in FIG. 2, the third and fourth nodes N3 and N4 become the output elements, the fifth node N5 becomes the reacting element, and the first node N1 operates as the input element.

An output speed of the third node N3 is represented as being fixed at "1," and an output speed of the fourth node N4 is lower than the output speed "1" of the third node N3.

Figure 3:
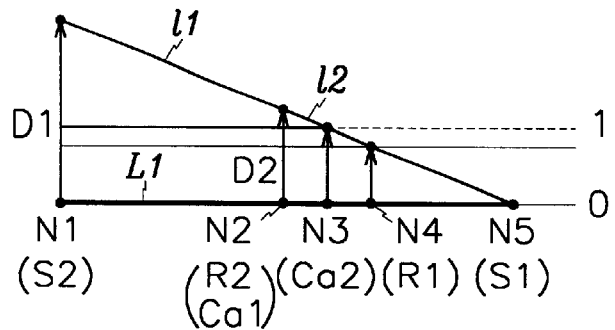
FIG. 3 is a drawing for illustrating shift ratios of first and second speeds according to a preferred embodiment of the present invention through a lever analogy method.
Figure 4:
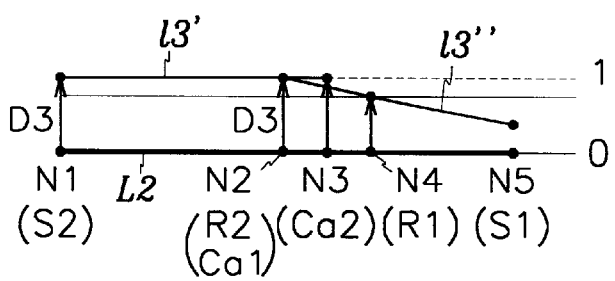
FIG. 4 is a drawing for illustrating a shift ratio of a third speed according to a preferred embodiment of the present invention through a lever analogy method.
Figure 5:
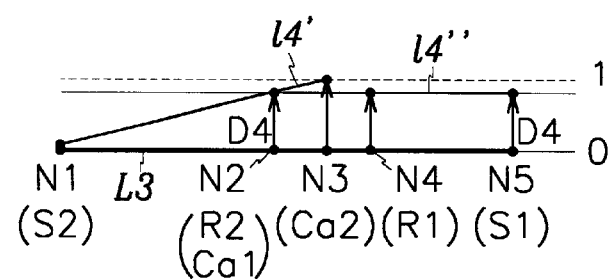
FIG. 5 is a drawing for illustrating a shift ratio of a fourth speed according to a preferred embodiment of the present invention through a lever analogy method.
Figure 6:
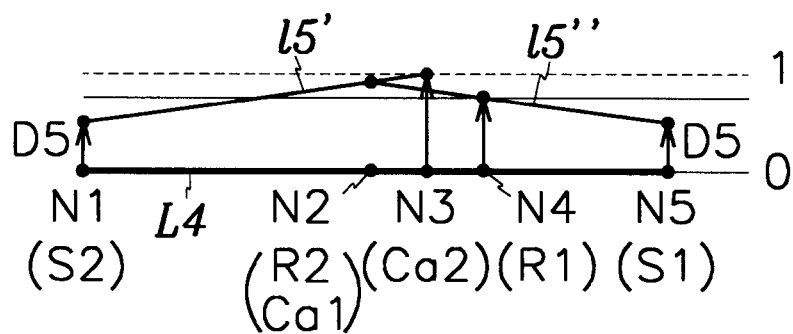
FIG. 6 is a drawing for illustrating a shift ratio of a fifth speed according to a preferred embodiment of the present invention through a lever analogy method.
Figure 7:
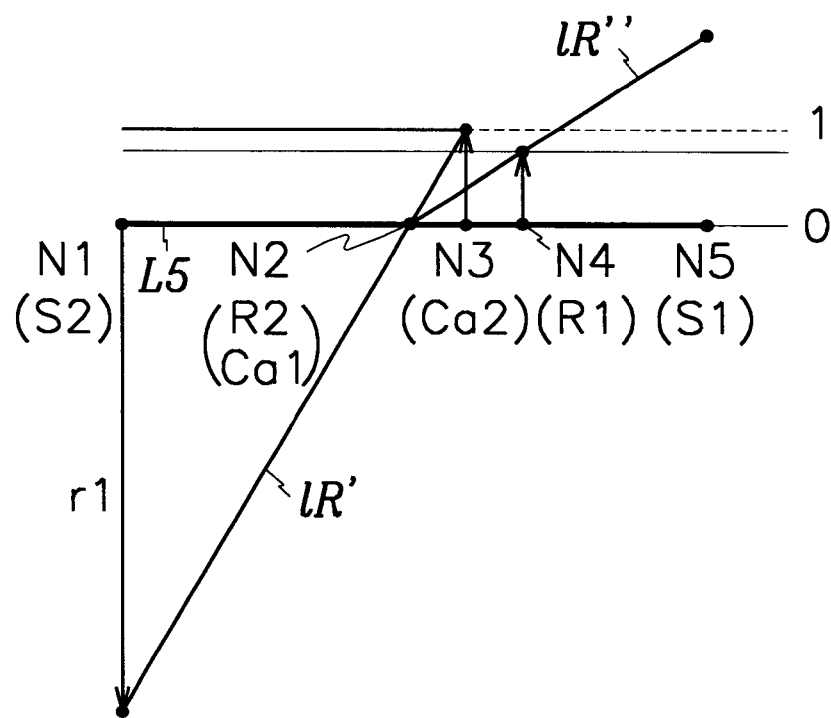
FIG. 7 is a drawing for illustrating a shift ratio of a reverse speed according to a preferred embodiment of the present invention through a lever analogy method.

Accordingly, an extended line connecting the output speed "1," outputted from the output node N3, to the reacting node N5 becomes a first-forward speed line l1 on FIG. 3.

Therefore, a line vertically connecting the input node N1 to the first speed line l1 becomes a first input speed line D1. The first input speed line D1 is higher than the output speed "1."

Accordingly, it is noted that an output number of rotations is much smaller than an input number of rotations, and a reduction in speed is realized through a first speed shift ratio.

Second-Forward Speed

In the above first-forward speed state, if vehicle speed and throttle opening are increased, the TCU disengages the first clutch C1 and operates the second clutch C2 as shown in the operation chart of FIG. 2. Accordingly, in the first lever L1 shown in FIG. 3, the input element is changed from the first node N1 to the second node N2 while the third and fourth nodes become the output elements and the fifth node becomes the reacting element.

It is still assumed that an output speed of the third node N3 is fixed at "1," and an output speed of the fourth node N4 is lower than the output speed "1" of the third node N3.

Therefore, an extended line connecting the output speed, outputted from the fourth node N4, to the reacting node N5 becomes the second-forward speed line l2.

Accordingly, a line vertically connecting the input node N2 to the second-forward speed line l2 becomes the second input speed line D2.

The second input speed line D2 is higher than the output speed "1," but it is lower than the first input speed line D1.

Accordingly, it is noted that an output number of rotations in the second speed is smaller than an input number of rotations, but the output power is higher in the first speed.

Third-Forward Speed

In the above second-forward speed state, if vehicle speed and throttle opening are increased, the transmission control unit disengages the first brake B1, and operates the first clutch C1. Accordingly, in the second lever L2 shown in FIG. 4, the third and fourth nodes N3 and N4 operate as the output elements, and the first and second node N1 and N2 become the input elements, the second node N2 also functions as a semi-reacting element.

It is still assumed that an output speed of the third node N3 is fixed at "1," and an output speed of the fourth node N4 is lower than the output speed "1" of the third node N3.

Therefore, an extended line connecting the value "1" of the first and second nodes N1 and N2 forms a second third-forward speed line l3". Additionally, when this value of the second node N2 is connected to the output of the fourth node N4 and the optional value of the fifth node N5, a first third-forward speed line l3' is generated. Here, a line vertically connecting the first and second nodes N1 and N2 input elements to the second third-forward speed line l3" represents the input speed D3.

That is, it can be noted that with an output number of rotations in the third forward speed being the same as that of the second forward speed, the third input speed line D3 is smaller than the second input speed line D2, so the speed in the third forward speed is greater than the speed in second forward speed. Additionally, the output of the third forward speed can be seen to be the same as that of the second forward speed.

Fourth-Forward Speed

In the above third speed state, if vehicle speed and throttle opening are increased, the TCU disengages the first clutch C1 and operates the third clutch C3. Accordingly, in the third lever L3 shown in FIG. 5, the third and fourth nodes N3 and N4 operate as the output elements, and the second and fifth nodes N2 and N5 become the input elements, the second node N2 also functions as a semi-reacting element.

It is still assumed that an output speed of the third node N3 is fixed at "1," and an output speed of the fourth node N4 is lower than the output speed "1" of the third node N3.

Accordingly, an extended line connecting the output speed "1" of the output node N3 to an output of the semi-reacting node N2 becomes a first fourth-forward speed line l4", and an extended line connecting the output speed of the output node N4 to the output of the semi-reacting node N2 becomes a second fourth-forward speed line l4".

Therefore, a line vertically connecting the output node N5 to the second fourth-forward speed line becomes a fourth input speed line D4, realizing an output having a higher speed than the third speed. That is, it can be noted that in the fourth forward speed, an overdrive is achieved in which an output number of rotations is higher than an input number of rotations.

Fifth-Forward Speed

In the above fourth-forward speed state, if vehicle speed and throttle opening are increased, the TCU disengages the second clutch C2 and operates the first clutch C1. Accordingly, in the fourth lever L4 shown in FIG. 6, the third and fourth nodes N3 and N4 operate as the output elements, and the first and fifth nodes N1 and N5 become the input elements. At this point, the second node N2 functions as a semi-reacting element.

It is still assumed that an output speed of the third node N3 is fixed at "1," and an output speed of the fourth node N4 is lower than the output speed "1" of the third node N3.

Accordingly, an extended line connecting the output speed "1" of the output node N3 to an output of the semi-reacting node N2 becomes a first fifth-forward speed line l5', and an extended line connecting the output speed of the output node N4 to the output of the semi-reacting node N2 becomes a second fifth-forward speed line l5".

Therefore, lines vertically connecting the output nodes N1 and N5 to the respective first and second fifth-forward speed lines each become fifth input speed lines D5, realizing an output having a higher speed than the fourth speed. That is, it can be noted that in the fifth forward speed, an overdrive is achieved in which an output number of rotations is higher than that of the fourth-forward speed.

Reverse Speed

If the driver changes the selector lever to a reverse R range, the TCU controls the first clutch C1 and the second brake B2 to operate as shown in FIG. 2. Accordingly, in the fifth lever L5 shown in FIG. 7, the third and fourth nodes N3 and N4 operate as the output elements, and the first node N1 operates as the input element. The second node N2 functions as the reacting element.

It is still assumed that an output speed of the third node N3 is fixed at "1," and an output speed of the fourth node N4 is lower than the output speed "1" of the third node N3.

Accordingly, an extended line connecting the output speed "1" of the output node N3 to the reacting node N2 becomes a first reverse speed line lR', and an extended line connecting the output of the output node N4 to the reacting node N2 becomes a second reverse speed line lR".

Therefore, a line vertically connecting the output nodes N1 to the respective the first reverse speed line lR' becomes an actual reverse input speed line r1, realizing reverse shifting. That is, it can be noted that the input of the reverse speed is opposite to the output.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A gear train for an automatic transmission, comprising:
   a first planetary gear set comprising a first element variably connected to an input shaft and a transmission housing, a second element variably connected to the input shaft and the transmission housing, and a third element connected to a transfer shaft to transmit power to the transfer shaft;
   a second planetary gear set comprising a fourth element variably connected to the transfer shaft to transmit power to the transfer shaft, a fifth element variably connected to the input shaft, and a sixth element fixedly connected to the second element to provide a combination element, the combination element being variably connected to the input shaft; and
   friction means for variably connecting the first, second, fifth, and sixth elements to either the input shaft or the transmission housing;
   wherein the first planetary gear set is a double pinion planetary gear set.

2. A gear train of claim 1 wherein the first element is a first sun gear, the second element is a first planet carrier, and the third element is a first ring gear.

3. A gear train of claim 1 wherein the second planetary gear set is a double pinion planetary gear set.

4. A gear train of claim 1 wherein the fourth element is a planet carrier, the fifth element is a sun gear, and the sixth element is a ring gear.

5. A gear train of claim 2 wherein the fourth element is a second planet carrier, the fifth element is a second sun gear, and the sixth element is a second ring gear.

6. A gear train of claim 5 wherein the friction means comprise a first clutch disposed between the input shaft and the second sun gear, a second clutch disposed between the input shaft and the combination of the first planet carrier and the second ring gear, a third clutch disposed between the input shaft and the first sun gear, a first brake disposed between the transmission housing and the first sun gear, and a second brake disposed between the first planet carrier and the transmission housing.

7. A gear train of claim 6 wherein a first speed is realized by operating the first clutch and the first brake, a second speed is realized by the second clutch and the first brake, a third speed is realized by operating the first and second clutches, a fourth speed is realized by operating the second and third clutches, a fifth speed is realized by the first and third clutches, and a reverse speed is realized by operating the first clutch and the second brake.

8. A gear train for an automatic transmission, comprising:
   a first planetary gear set comprising a first element variably connected to an input shaft and a transmission housing, a second element variably connected to the input shaft and the transmission housing, and a third element connected to a transfer shaft to transmit power to the transfer shaft;
   a second planetary gear set comprising a fourth element variably connected to the transfer shaft to transmit power to the transfer shaft, a fifth element variably connected to the input shaft, and a sixth element fixedly connected to the second element to provide a combination element, the combination element being variably connected to the input shaft; and
   friction means for variably connecting the first, second, fifth, and sixth elements to either the input shaft or the transmission housing;
   wherein the transfer shaft comprises first and second driven gears which are respectively engaged with first and second drive gears respectively fixed on the third and fourth elements.

9. A gear train of claim 8, wherein the first planetary gear set is a double pinion planetary gear set.

10. A gear train of claim 8, wherein the second planetary gear set is a double pinion planetary gear set.

11. A gear train of claim 8, wherein the first element is a first sun gear, the second element is a first planet carrier, and the third element is a first ring gear.

12. A gear train of claim 11, wherein the fourth element is a second planet carrier, the fifth element is a second sun gear and the sixth element is a second ring gear.

13. A gear train of claim 12, wherein the friction means comprise a first clutch disposed between the input shaft and the second sun gear, a second clutch disposed between the input shaft and the combination of the first planet carrier and the second ring gear, a third clutch disposed between the input shaft and the first sun gear, a first brake disposed between the transmission housing and the first sun gear, and a second brake disposed between the first planet carrier and the transmission housing.

14. A gear train of claim 13, wherein a first speed is realized by operating the first clutch and the first brake, a second speed is realized by operating the second clutch and the first brake, a third speed is realized by operating the first and second clutches, a fourth speed is realized by operating the second and third clutches, a fifth speed is realized by operating the first and third clutches, and a reverse speed is realized by operating the first clutch and the second brake.

* * * * *